United States Patent [19]

Wright et al.

[11] Patent Number: 4,688,995

[45] Date of Patent: Aug. 25, 1987

[54] PROPELLER MODULE FOR AN AERO GAS TURBINE ENGINE

[75] Inventors: William B. Wright, Leicester; Addison C. Maguire, Derby, both of England

[73] Assignee: Rolls-Royce plc, London, England

[21] Appl. No.: 832,771

[22] Filed: Feb. 25, 1986

[30] Foreign Application Priority Data

Apr. 17, 1985 [GB] United Kingdom ............... 8509837

[51] Int. Cl.⁴ .............................................. B64C 11/48
[52] U.S. Cl. ................................... 416/127; 416/129
[58] Field of Search ............... 416/127, 128, 129, 130, 416/124, 157 B, 170 R

[56] References Cited

U.S. PATENT DOCUMENTS

| | | | |
|---|---|---|---|
| 2,394,299 | 2/1946 | Friedrich | 416/128 X |
| 3,900,274 | 8/1987 | Johnston | 416/155 |
| 4,486,146 | 12/1984 | Campion | 416/129 |
| 4,563,129 | 1/1986 | Pagluica | 416/170 R X |
| 4,591,313 | 5/1986 | Miyatake et al. | 416/155 |

FOREIGN PATENT DOCUMENTS

| | | | |
|---|---|---|---|
| 865942 | 6/1941 | France | 416/127 |
| 887543 | 11/1943 | France | 416/127 |
| 897057 | 3/1945 | France | 416/129 |
| 900664 | 7/1945 | France | 416/127 |
| 977459 | 4/1951 | France | 416/127 |
| 1005734 | 4/1952 | France | 416/129 |
| 402942 | 3/1943 | Italy | 416/127 |
| 403673 | 5/1943 | Italy | 416/129 |
| 407125 | 9/1944 | Italy | 416/128 |
| 259296 | 6/1949 | Switzerland | 416/129 |
| 531756 | 1/1941 | United Kingdom | 416/127 |
| 544948 | 5/1942 | United Kingdom . | |
| 575765 | 3/1946 | United Kingdom . | |
| 586557 | 3/1947 | United Kingdom . | |
| 2142116 | 6/1984 | United Kingdom . | |
| 2145777 | 8/1984 | United Kingdom . | |

Primary Examiner—Everette A. Powell, Jr.
Attorney, Agent, or Firm—Cushman, Darby & Cushman

[57] ABSTRACT

A propeller module for an aero gas turbine engine comprises two contra-rotating propellers driven by a reduction gearbox positioned axially between the propellers.

Pitch change mechanisms operated by a pitch change power unit are provided to change the pitch of the propeller blades. The pitch change power unit is positioned in the hub of the second multi-bladed propeller and is remote from the first multi-bladed propeller. The first and second pitch change mechanisms are mounted on the reduction gearbox. The first pitch change mechanism comprises first pitch change gears which are rotatably mounted on a carrier of the reduction gearbox by spindles which extend axially through planet gears of the gearbox. The second pitch change mechanism comprises second pitch change gears rotatably mounted on the carrier.

7 Claims, 6 Drawing Figures

PROPELLER MODULE FOR AN AERO GAS TURBINE ENGINE

The present invention relates to a propeller module for an aero gas turbine engine, particularly for a propeller module comprising two contra-rotating propellers.

At present propeller modules for aero gas turbine engines of the type with two contra-rotating propellers positioned at the upstream or downstream end of the gas turbine engine, known as tractor or pusher propellers respectively, require a differential reduction gearbox to drive the propellers in contra-rotation. The propellers also require mechanism to control blade pitch.

As a result of these requirements the overall axial length of the propeller module and hence the aero gas turbine engine is increased, and this also leads to an increase in weight of the aero gas turbine engine in order to carry the propeller module.

The present invention seeks to provide a propeller module of the type with two contra-rotating propellers driven by a differential reduction gearbox which has reduced axial length and reduced weight.

Accordingly the present invention provides a propeller module for an aero gas turbine engine comprising an extension shaft adapted to drive a differential reduction gearbox and to be driven by a coaxial shaft extending from a power turbine of the aero gas turbine engine, the extension shaft being adapted to extend coaxially through a cantilevered structure secured to the aero gas turbine engine, a first multi-bladed propeller and a coaxial second multi-bladed propeller being adapted to be driven in contra-rotation by the differential reduction gearbox, the differential reduction gearbox being positioned coaxially with and axially between the first and second multi-bladed propellers, the cantilevered structure being adapted to extend coaxially into the hub of the first multi-bladed propeller, the first multi-bladed propeller being adapted to be rotatably mounted on the cantilevered structure, the second multi-bladed propeller being rotatably mounted to the hub of the first multi-bladed propeller.

The differential reduction gearbox may comprise a sun gear adapted to engage with the extension shaft and driving planet gears rotatably mounted in a carrier, the planet gears driving an annulus gear, the carrier being adapted to be rotatably mounted coaxially in the cantilevered structure and to drive the second multi-bladed propeller, the annulus gear driving the first multi-bladed propeller in contra-rotation to the second multi-bladed propeller.

First and second pitch change means may be provided for the first and second multi-bladed propellers respectively, the first and second pitch change means being mounted on the carrier of the differential reduction gearbox.

The first pitch change means may comprise a first pitch change gear rotatably mounted to the reduction gears, an idler gear rotatably mounted to the cantilevered structure, a first drum positioned coaxially within and rotatably mounted to the hub of the first multi-bladed propeller, the first drum having a first recirculating ball screw and nut adapted to rotate the blades of the first multi-bladed propeller, the first pitch change gear driving the idler gear and the first drum, a pitch change power unit adapted to cause relative rotation between the first pitch change gear and the reduction gear in order to cause relative rotation between the first drum and the first multi-bladed propeller to change the pitch of the blades of the first multi-bladed propeller.

The idler gear may be adapted to reverse the direction of rotation of the first recirculating ball screw to allow the first drum and ball screw to rotate with the first multi-bladed propeller.

The second pitch change means may comprise a second pitch change gear rotatably mounted to the carrier, a second drum positioned coaxially within and rotatably mounted to the hub of the second multi-bladed propeller, the second drum having a second recirculating ball screw and nut adapted to rotate the blades of the second multi-bladed propeller, the second pitch change gear driving the second drum, a pitch change power unit adapted to cause rotation of the second pitch change gear in order to cause relative rotation between the second drum and the second multi-bladed propeller to change the pitch of the blades of the second multi-bladed propeller.

The invention also provides an aero gas turbine engine comprising in flow series a compressor, a combustor, a turbine and a power turbine, the turbine being adapted to drive the compressor, and the power turbine being adapted to drive a differential reduction gearbox via a shaft and an extension shaft, the extension shaft extending coaxially through a cantilevered structure secured to the aero gas turbine engine, a first multi-bladed propeller and a coaxial second multi-bladed propeller being adpated to be driven in contra-rotation by the differential reduction gearbox, the differential reduction gearbox being positioned coaxially with and axially between the first and second mulit-bladed propeller, the cantilevered structure extending coaxially into the hub of the first multi-bladed propeller, the first multi-bladed propeller being rotatably mounted on the cantilevered structure, the second multi-bladed propeller being rotatably mounted to the hub of the first multi-bladed propeller.

The first and second multi-bladed propellers may be positioned upstream of the compressor, the cantilevered structure extending in an upstream direction coaxially into the hub of the first multi-bladed propeller, the second multi-bladed propeller being positioned upstream of the first multi-bladed propeller.

The first and second multi-bladed propellers may be positioned downstream of the power turbine, the cantilevered structure extending in a downstream direction coaxially into the hub of the first multi-bladed propeller, the second multi-bladed propeller being positioned downstream of the first multi-bladed propeller.

The present invention will be more fully described by way of reference to the accompanying drawings in which.

Figure 1:
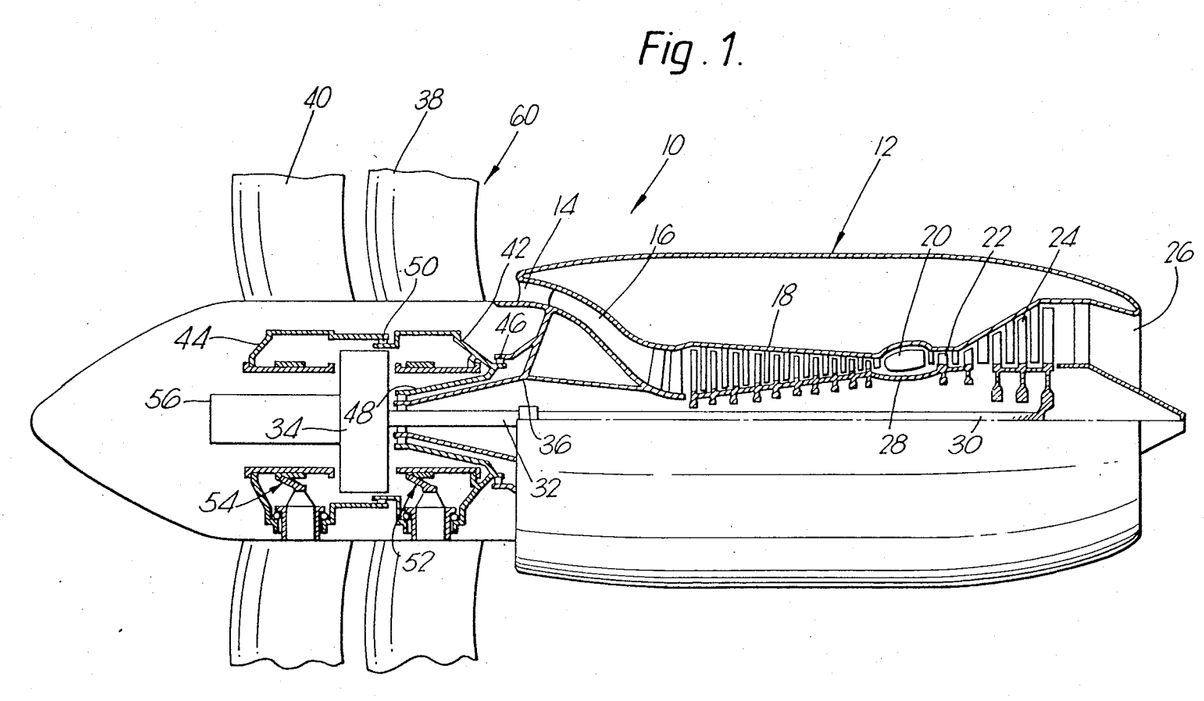
FIG. 1 is a partially cut away view of an aero gas turbine engine having a propeller module according to the present invention.

An aero gas turbine engine 10 of the turbo-propeller type is shown in FIG. 1, and in this example is a tractor type turbo-propeller aero gas turbine engine. The aero gas turbine engine 10 comprises a core engine 12 and a propeller module 60. The core engine 12 comprises in flow series an annular inlet 14, a swan neck duct 16 leading to a compressor 18, a combustion system 20, a turbine 22, a power turbine 24 and an exhaust nozzle 26. Air flows into the inlet 14 and along the swan neck duct 16 to the compressor 18, where the air is compressed before being supplied into the combustion system 20. Fuel is injected into the combustion system 20, and is burnt in the compressed air to produce hot gases which drive the turbine 22 and power turbine 24 before flowing out of the exhaust nozzle 26. The turbine 22 drives the compressor 18 via a shaft 28 and the power turbine 24 drives the propeller module 60 via a shaft 30.

The propeller module 60 comprises an extension shaft 32 which is secured coaxially at its downstream end to the shaft 30 extending from the power turbine 24, and engages with a differential reduction gearbox 34 at its upstream end. The extension shaft 32 extends coaxially through a cantilevered structure 36 which extends in an axially upstream direction from and is secured to the load carrying structure of the aero gas turbine engine 10. The differential reduction gear-box 34 drives a first multi-bladed propeller 38 and a coaxial second multi-bladed propeller 40 in contra-rotation. The first multi-bladed propeller 38 has a hub 42 which carries the blades, and similarly the second multi-bladed propeller 40 has a hub 44 which carries the blades. The cantilevered structure 36 is adapted to extend coaxially into the hub 42 of the first multi-bladed propeller 38, and the first multi-bladed propeller 38 is arranged to be rotatably mounted on the cantilevered structure 36 by means of the axially spaced bearings 46 and 48. The second multi-bladed propeller 40 is arranged to be rotatably mounted on to the hub 42 of the first multi-bladed propeller 38 by a bearing 50.

The first and second multi-bladed propellers 38 and 40 are also provided with pitch change mechanisms 52 and 54 which are operated by a pitch change power unit 56. The differential reduction gearbox 34 is positioned coaxially with and axially between the first and second multi-bladed propellers.

Figure 2:
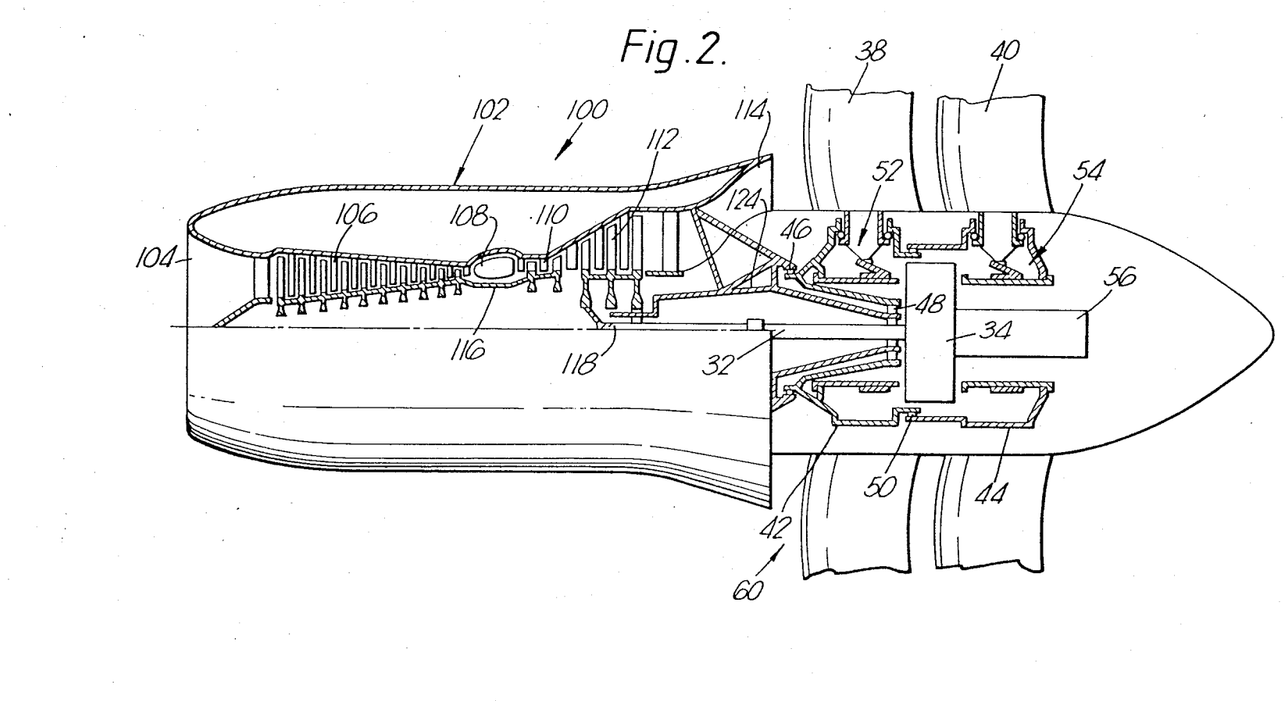
FIG. 2 is a partially cut away view of an alternative aero gas turbine engine having a propeller module according to the present invention.

FIG. 2 shows an aero gas turbine engine 100 of the pusher turbo-propeller type, and comprises a core engine 102 and a propeller module 60. The core engine 102 comprises in flow series an inlet 104 a compressor 106, a combustion system 108, a turbine 110, a power turbine 112 and an exhaust nozzle 114. The turbine 110 drives the compressor via the shaft 116, and the power turbine 112 drives the propeller module 60 via a shaft 118.

In this example the propeller module 60 is identical to the propeller module 60 in FIG. 1, and like parts are denoted by like numerals. The only difference is that the propeller module 60 is positioned at the downstream end of the core engine 100, and the shaft 30 extends in a downstream direction and is secured coaxially to the extension shaft 32. The extension shaft 32 extends coaxially through a cantilevered structure 124 which extends in an axially downstream direction from and is secured to the load carrying structure of the aero gas turbine engine 100. The cantilevered structure 124 is adapted to extend coaxially into the hub 42 of the first multi-bladed propeller 38, and the first multi-bladed propeller 38 is arranged to be rotatably mounted on the cantilevered structure 124 by means of the axially spaced bearings 46 and 48.

The propeller module 60 is shown in more detail in FIGS. 3, 4, 5 and 6. The pitch change mechanisms 52 and 54 for the first and second multi-bladed propellers 38 and 40 comprise a first and second drum 62 and 64 respectively which are positioned coaxially within and are rotatably mounted onto the hubs 42 and 44 by bearings 86, 88 and 90, 92 respectively. The first and second drums 62 and 64 have first and second recirculating ball threads and nuts 66 and 68 respectively. The nuts 66 and 68 have a plurality of circumferentially arranged equispaced arms 70 and 72, one for each propeller blade, which are secured to the pivotal root portions 74 and 76 of the multi-bladed propellers. The pivotal root portions 74 and 76 of the blades are rotatably mounted in apertures 78 and 80 in the hubs 42 and 44 by ball bearings 82 and 84, so as to allow the propeller blades to be rotated to allow the pitch of the propeller blades to be varied.

Figure 3:
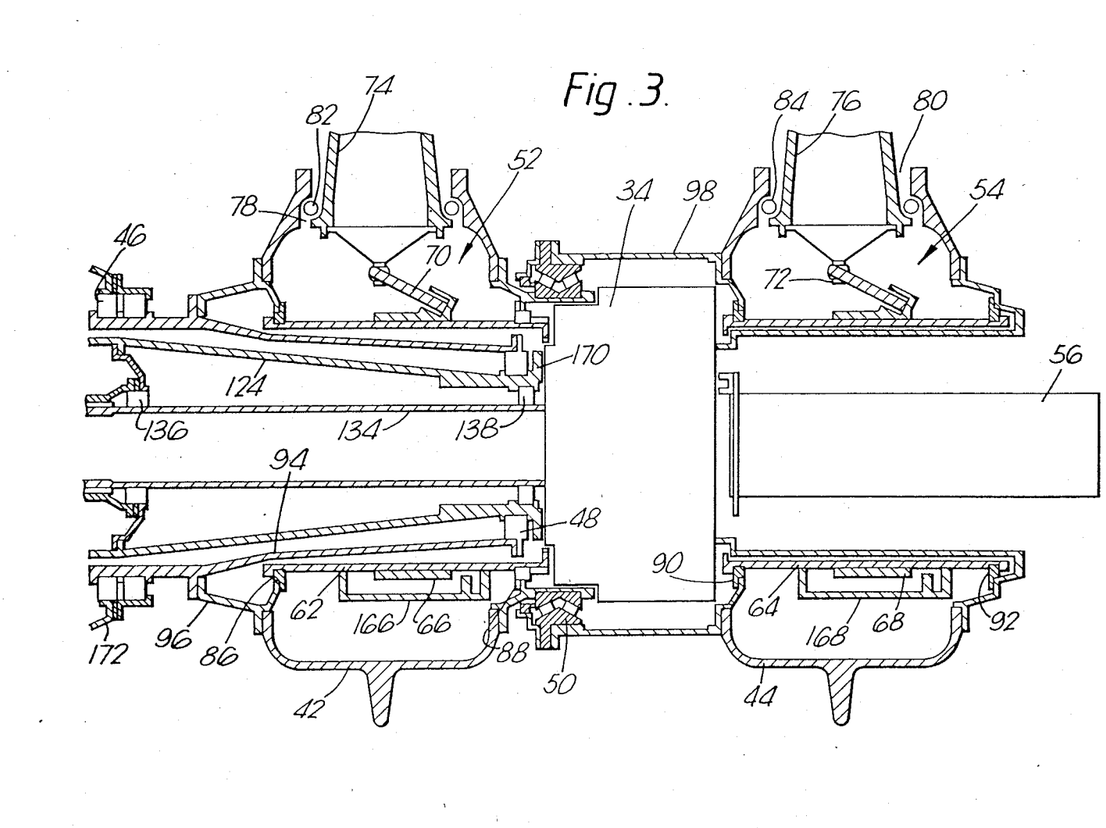
FIG. 3 is an enlarged vertical section through the propeller module in FIG. 2.
Figure 4:
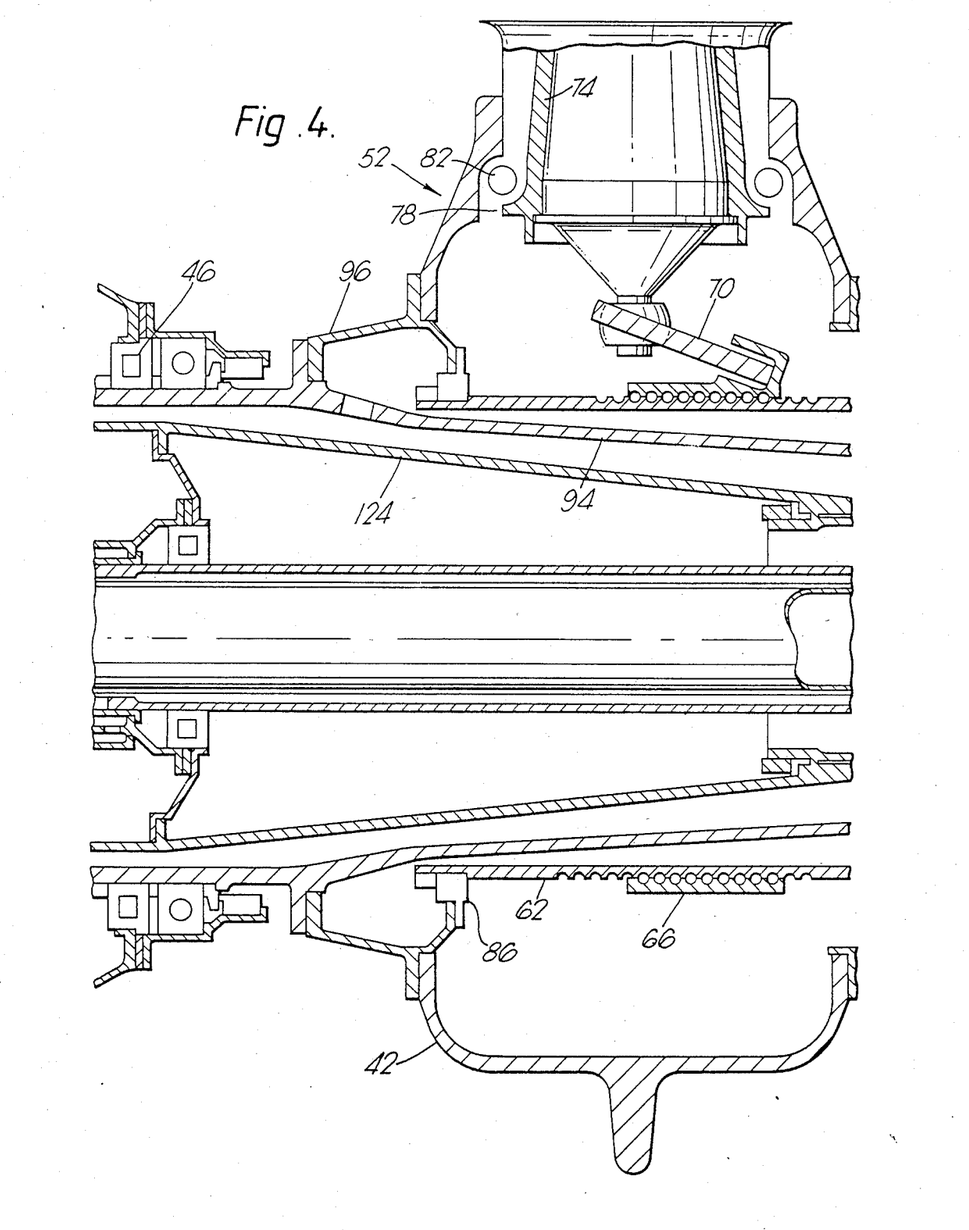
FIG. 4 is an enlarged vertical section through the first propeller in FIG. 3.
Figure 5:
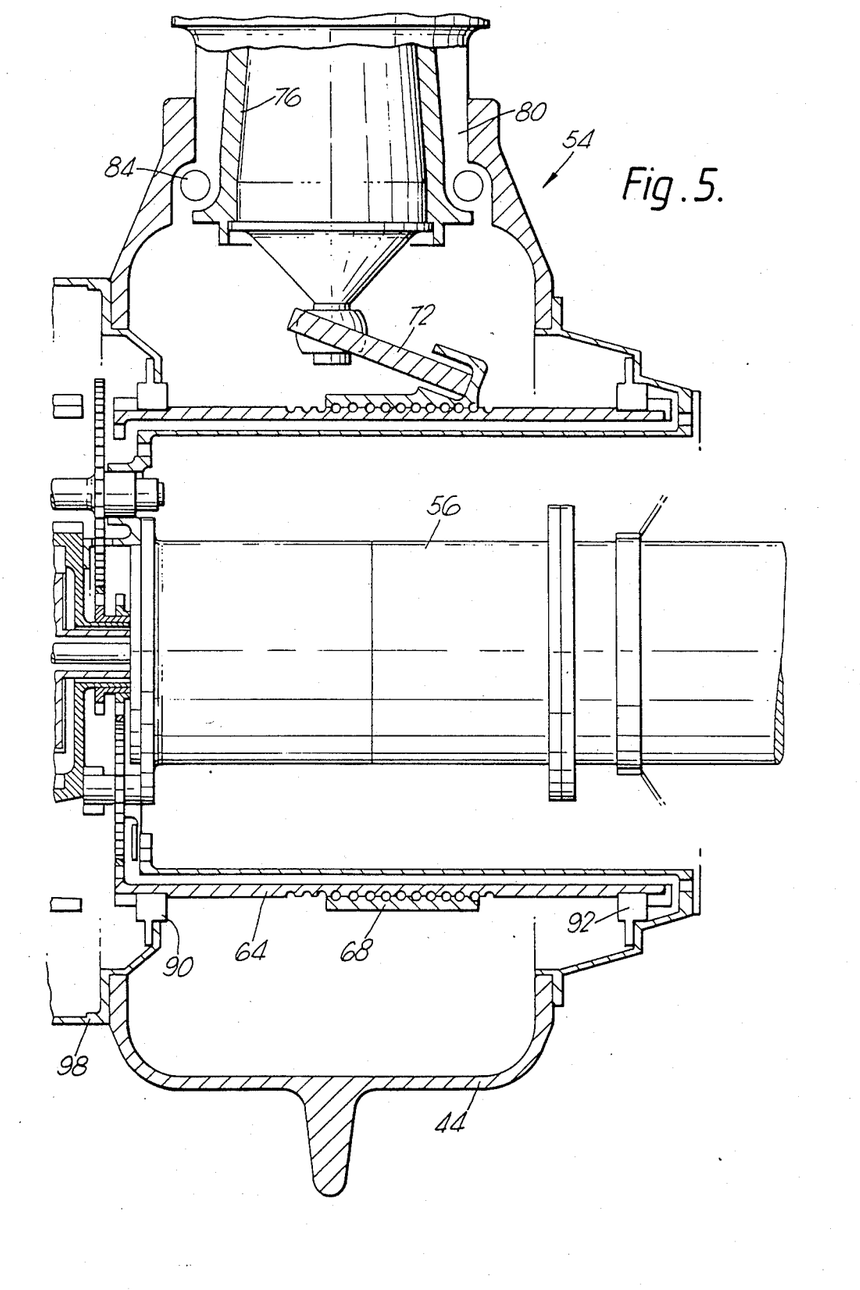
FIG. 5 is an enlarged vertical section through the second propeller in FIG. 3.

The pitch of the propeller blades is varied by relative rotation between the hubs 42, 44 and the first and second drums 62, 64 which causes the nuts 66 and 68 to rotate on the recirculating ball threads, and thereby cause the arms 70 and 72 to rotate the pivotal root portions 74 and 76 on the bearings 82 and 84.

Figure 6:
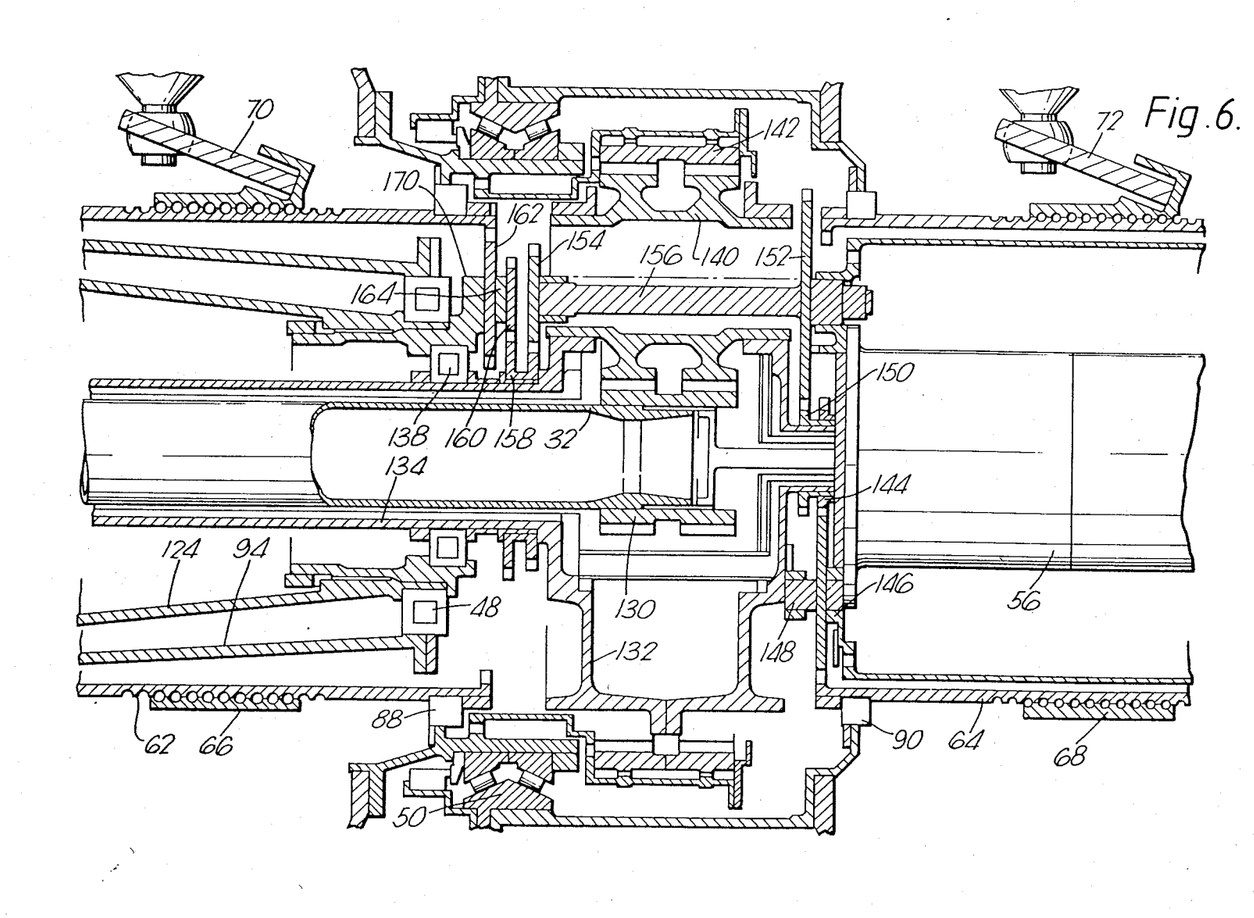
FIG. 6 is an enlarged vertical section through a differential reduction gearbox and pitch change means in FIG. 3.

The first and second drums 62, 64 are caused to rotate relative to the hubs 42 and 44 by the pitch change unit 56, and further pitch change mechanisms incorporated in the differential reduction gearbox 34, as shown in FIG. 6.

The hub 42 of the first multi-bladed propeller 38 has cylindrical bodies 96 and 94 upon which the hub 42 is rotatably mounted to the cantilevered structure 124 by the bearings 46 and 48.

The differential reduction gearbox 34 comprises a sun gear 130 which is adapted to engage with and be driven by the extension shaft 32. The sun gear 130 drives reduction gears 140 which are rotatably mounted in a carrier 132. The carrier 132 is coaxial with the extension shaft 32 and sun gear 130, and has an integral cylindrical body 134 which extends coaxially through the hub of the first multi-bladed propeller 38. The cylindrical body 134 is also adapted to extend coaxially through and be rotatably mounted onto the cantilevered structure 124 by the bearings 136 and 138. The planet gears 140 drive an annulus gear 142 which is secured to the hub 42 of the first multi-bladed propeller 38 and the carrier 132 drives the hub 44 of the second multi-bladed propeller 40. The carrier 132 and annulus gear 142 are driven in contrarotation by the planet gears 140, and this drives the first and second multi-bladed propellers 38 and 40 in contra-rotation.

The pitch change unit 56 is arranged to drive a sun gear 144, and the sun gear 144 is arranged to drive planet gears 146 which are rotatably mounted onto the carrier 132 by spindle 148. The planet gears 146 are arranged to drive the drum 64 so as to vary the pitch of the second multi-bladed propeller 40.

The pitch change unit 56 is also arranged to drive a sun gear 150, and the sun gear 150 is arranged to drive planet gears 152 which are rotatably mounted onto the carrier 132 by spindle 156. A second planet gear 154 is rotatably mounted on the carrier 132 by the spindle 156, and the planet gear 154 is arranged to engage a double sun gear 158. The double sun gear 158 is arranged to drive the idler gears 160 and 162 which are rotatably mounted to the cantilevered structure 124 by a spindle 164. The idler gear 162 is arranged to drive the first drum 62 so as to vary the pitch of the first propeller 38.

In operation, as mentioned previously, the annulus gear 142 and the hub 42 of the first multi-bladed propeller 38 are driven in contra-rotation to the carrier 132 and the hub 44 of the second multi-bladed propeller 40. The first and second drums 62 and 64 are arranged to be driven by the pitch change unit 56 via their respective gearing so that the first drum rotates in the same direction and rotational speed as the first hub, and the second drum rotates in the same direction and rotational speed as the second hub. In order to achieve this the double sun gear 158 and sun gear 150 rotate in the same direction as the carrier 132. The gears 160 and 162, which are rotatably mounted to the fixed cantilevered structure 124, drive the first drum 62 in contra-rotation to the carrier 132 and thus in the same direction as the first hub 42. The sun gear 144 rotates in the opposite direction to the sun gear 150, and the gears 146, which are rotatably mounted to the carrier 132, drive the second drum 64 in the same direction as the carrier 132 and the second hub 44.

In order to change the pitch of the multi bladed propellers, the sun gears 144 and 150 are rotated by the pitch control unit 56 so as to cause relative rotation between the drums and respective propeller hubs. Once the pitch has been selected there is no relative rotation between the drums and respective propeller hubs. When changing blade pitch of both propellers to either fine or coarse pitch settings, the sun gears 144 and 150 rotate in opposite directions.

The propellers may be provided with pitch lock screws 166, 168 which are interposed circumferentially between the blades of each propeller, and are positioned on the recirculating ball threads of the drums 62 and 64. In normal operation the pitch lock screws run at a small preset clearance behind the nuts 66 and 68. If the pitch change mechanism fails, the blades are prevented from seeking fine pitch by the nuts 66 and 68 abutting the pitch lock screws 166, 168 which lock up due to friction.

The propeller module may also be provided with a separate self contained oil system with its own pressure and scavenge pumps, an air cooled oil cooler and a pressure filter which will not be disturbed during removal of the propeller module. This also reduces the risk of oil contamination from the core engine.

The pitch change unit 56 may be an electric or an electrohydraulic unit which drives another reduction gear to drive the sun gear 144 and 150.

The cantilevered structure 124 may be engaged in the hub 42 of the first propeller by moving the propeller module coaxially into location so that a dogged connection is made between the cantilevered structure 124 and a cooperating stationary structure 170 carrying the gears 160 and 162. The propeller module 60 is secured to the core engine by bolted flanges 172 radially outside of bearing 46.

We claim:

1. A propeller module for an aero gas turbine engine comprising an extension shaft, a reduction gearbox, a first multi-bladed propeller and a second coaxial multi-bladed propeller, the extension shaft being driven by a coaxial shaft of a type that extends from a power turbine of an aero gas turbine engine, the extension shaft being arranged to extend coaxially through a cantilevered structure secured to the aero gas turbine engine, the reduction gearbox being drivable by the extension shaft, the reduction gearbox comprising a sun gear, a plurality of planet gears, a planet carrier and an annulus gear, the sun gear being driven by the extension shaft, the planet gears being driven by the sun gear and being rotatably mounted within the planet carrier, the annulus gear being driven by the planet gears, the reduction gearbox being positioned axially between and coaxially with the first and second multi-bladed propellers, the first multi-bladed propeller being rotatably mounted on the cantilevered structure, the second multi-bladed propeller being rotatably mounted on the first multi-bladed propeller, the planet carrier being arranged to drive the second multi-bladed propeller, the annulus gear being arranged to drive the first multi-bladed propeller in contra-rotation to the second multi-bladed propeller, a first pitch change means to change the pitch of the blades of the first multi-bladed propeller and a second pitch means to change the pitch of the blades of the second multi-bladed propeller, a pitch change control unit mounted adjacent second multi-bladed propeller, to operate the first and second pitch change means, the first pitch change means comprising first planet gears, second planet gears and spindles, the spindles extending axially through the planet carrier, the first planet gears and second planet gears being secured to opposite ends of the spindles, the spindles being rotatably mounted on the carrier.

2. A propeller module as claimed in claim 1 in which the first pitch change means comprises a first drum positioned coaxially within and rotatably mounted on the first hub of the first multi-bladed propeller, the first drum having a first recirculating ball screw and a nut rotatably mounted thereon, the nut having a plurality of arms, each arm being secured to a propeller blade to rotate the blades, idler gears rotatably mounted on the cantilevered structure mesh with and drive the first drum, the second planet gears of the first pitch change means drive the idler gears via a double sun gear, the pitch change control unit drives a first sun gear, the first sun gear meshes with and drives the first planet gears of the first pitch change means.

3. A propeller module as claimed in claim 1 in which the spindles extend axially through the planet gears of the reduction gearbox, the spindles being rotatably mounted on the carrier.

4. A propeller module as claimed in claim 2 in which the idler gears are disposed so as to reverse the direction of rotation of the first drum to allow the first drum to rotate with the first multi-bladed propeller.

5. A propeller module as claimed in claim 1 in which the second pitch change means comprises planet gears rotatably mounted on the planet carrier by a spindle, a second drum positioned coaxially within and rotatably mounted on the second hub of the second multi-bladed propeller, the second drum having a second recirculating ball screw and a nut rotatably mounted thereon, the nut having a plurality of arms, each arm being secured to a propeller blade to rotate the blades, the pitch change control unit drives a second sun gear, the second sun gear meshes with and drives the planet gears, the planet gears meshing with and drive the second drum.

6. An aero gas turbine engine as claimed in claim 5 in which the first and second multi-bladed propellers are positioned upstream of the compressor, the cantilevered structure extending in an upstream direction coaxially into the hub of the first multi-bladed propeller, the second multi-bladed propeller being positioned upstream of the first multi-bladed propeller.

7. An aero gas turbine engine as claimed in claim 5 in which the first and second multi-bladed propellers are positioned downstream of the power turbine, the cantilevered structure extending in a downstream direction coaxially into the hub of the first multi-bladed propeller, the second multi-bladed propeller being positioned downstream of the first multi-bladed propeller.

* * * * *